United States Patent [19]
Smith et al.

[11] Patent Number: 5,839,329
[45] Date of Patent: Nov. 24, 1998

[54] METHOD FOR INFILTRATING PREFORMED COMPONENTS AND COMPONENT ASSEMBLIES

[75] Inventors: Redd H. Smith, Salt Lake City; Sidney L. Findley, West Valley City; Trent N. Butcher, Midvale, all of Utah

[73] Assignee: Baker Hughes Incorporated, Houston, Tex.

[21] Appl. No.: 719,281

[22] Filed: Sep. 24, 1996

Related U.S. Application Data

[63] Continuation-in-part of Ser. No. 691,863, Aug. 2, 1996, which is a continuation of Ser. No. 438,200, May 9, 1995, Pat. No. 5,544,550, which is a division of Ser. No. 213,866, Mar. 16, 1994, Pat. No. 5,433,280.

[51] Int. Cl.$^6$ .................................................... B21K 5/06
[52] U.S. Cl. ........................................ 76/108.2; 76/104.1
[58] Field of Search .............................. 76/108.2, 108.1, 76/104.1, DIG. 2; 175/426, 434; 419/44

[56] References Cited

U.S. PATENT DOCUMENTS

| | | |
|---|---|---|
| 3,471,921 | 10/1969 | Feenstra et al. . |
| 3,757,878 | 9/1973 | Wilder et al. . |
| 3,757,879 | 9/1973 | Wilder et al. . |
| 4,398,952 | 8/1983 | Drake . |
| 4,484,644 | 11/1984 | Cook et al. . |
| 4,863,538 | 9/1989 | Deckard . |
| 4,884,477 | 12/1989 | Smith et al. . |
| 4,919,013 | 4/1990 | Smith et al. . |
| 5,000,273 | 3/1991 | Horton et al. . |
| 5,017,753 | 5/1991 | Deckard . |
| 5,090,491 | 2/1992 | Tibbitts et al. . |
| 5,101,692 | 4/1992 | Simpson . |
| 5,132,143 | 7/1992 | Deckard . |
| 5,155,321 | 10/1992 | Grube et al. . |
| 5,155,324 | 10/1992 | Deckard et al. . |
| 5,156,697 | 10/1992 | Bourell et al. . |
| 5,182,170 | 1/1993 | Marcus et al. . |
| 5,252,264 | 10/1993 | Forderhase et al. . |
| 5,284,695 | 2/1994 | Barlow et al. . |
| 5,304,329 | 4/1994 | Dickens, Jr. et al. . |
| 5,316,580 | 5/1994 | Deckard . |
| 5,332,051 | 7/1994 | Knowlton . |
| 5,342,919 | 8/1994 | Dickens, Jr. et al. . |
| 5,352,405 | 10/1994 | Beaman et al. . |
| 5,373,907 | 12/1994 | Weaver . |
| 5,385,780 | 1/1995 | Lee . |
| 5,441,121 | 8/1995 | Tibbitts . |
| 5,453,241 | 9/1995 | Akerman et al. . |

FOREIGN PATENT DOCUMENTS

| | | |
|---|---|---|
| 0 096 591 | 12/1983 | European Pat. Off. . |
| 0 145 421 | 6/1985 | European Pat. Off. . |
| 33 47 501 A1 | 5/1985 | Germany . |
| 1 572 543 | 7/1980 | United Kingdom . |
| 2 296 673 | 7/1996 | United Kingdom . |
| WO 9003893 | 4/1990 | WIPO . |
| WO 9208592 | 5/1992 | WIPO . |

OTHER PUBLICATIONS

Dvorak, Paul, "Rapid Prototypes for Production Parts", *Machine Design*, pp. 48–54, Oct. 8, 1993.
Author unknown, "Models in Minutes—and At Your Desk", *Machine Design*, pp. 20 & 23, Oct. 22, 1993.
Author unknown, "Rapid Mold Maker Promise Faster Metal Prototypes", *Machine Design*, Nov. 26, 1992.
Author unknown, "Protech Engineer Applies Finishing Touch to Stereolithography", pp. 36 & 37, undated.

(List continued on next page.)

*Primary Examiner*—Douglas D. Watts
*Attorney, Agent, or Firm*—Trask, Britt & Rossa

[57] ABSTRACT

A method of infiltrating preformed, bonded-particulate components, such as rotary bits, for subterranean drilling manufactured by techniques such as layered-manufacturing or those employed in rapid prototyping technology. A support structure is provided for the preformed component to physically support the preformed component during various manufacturing processes such as sintering and infiltration.

40 Claims, 4 Drawing Sheets

OTHER PUBLICATIONS

Protech Services, Inc. company brochure, undated.

Tait, David, Autofact '93 Conference materials entitled "Cashing in on Rapid Prototyping", Nov. 10, 1993.

Wohlers, Terry, Autofact '93 Conference materials entitled Advancements in Rapid Prototyping, Nov. 10, 1993.

News Release—from Soligen, Inc., entitled Soligen Announces DSPC™ Machine Order by Ashland Chemical, Jul. 14, 1993.

News Release—from Soligen, Inc. entitled "Soligen Demonstrates Fast Production of Casting Molds is Feasible Multiple Jets Used to Greatly Increase Production Speed", Aug. 17, 1993.

News Release—from Soligen, Inc., entitled "Soligen Demonstrates Surface Finish Improvement for Casting Process", Nov. 8, 1993.

Soligen, Inc. brochure entitled "Technology Backgrounder", May 1993.

Soligen, Inc. brochure entitled "If all metal parts were this simple, there would be no need for Direct Shell Production Castings", undated.

Ashley, Steven, "CGI Casting: A New Iron in the Fire", *Mechanical Engineering,* vol. 114/No. 11, pp. 49–51, Nov. 1992.

Uziel, Yehoram, An Unconventional Approach to Producing Investment Casting, *Modern Casting,* Aug. 1993.

Prioleau, Frost, et al., "The Virtual Vision Story", *Pro E The Magazine,* vol. 1, No. 2, pp. 1–4, Fall 1993.

DTMonitor Newsletter, vol. 3, No. 2, Summer 1993.

Teague, Paul E., et al. Prototyping Expands Design's Portfolio, *Design News,* Jun. 21, 1993.

Lom–1015 brochure entitled "The Power of Lom is now within reach", undated.

Stratasys™, Inc. brochure for FDM 1000®, undated.

METHOD FOR INFILTRATING PREFORMED COMPONENTS AND COMPONENT ASSEMBLIES

This application is a continuation-in-part of co-pending U.S. patent application Ser. No. 08/691,863 filed Aug. 2, 1996, which is a continuation of U.S. patent application Ser. No. 08/438,200, filed May 9, 1995, now U.S. Pat. No. 5,544,550 which is a divisional of U.S. patent application Ser. No. 08/213,866, filed Mar. 16, 1994, now U.S. Pat. No. 5,433,280. This application is also related to U.S. patent application Ser. No. 08/661,434 filed Jun. 11, 1996, now abandoned.

BACKGROUND OF THE INVENTION

1. Field of the Invention

The present invention relates generally to a method and apparatus for completing articles of manufacture from preformed components and, more particularly, to a method and apparatus for infiltrating preformed porous components comprising particulates and that may have been formed by a method of layered-manufacturing. The method and apparatus disclosed has particular applicability for large and/or heavy articles of manufacture formed of such components or assemblies of such components that, because of their mass, may require some form of structural support during the sintering and subsequent infiltration process.

2. State of the Art

Various methods of forming metal components have been known for generations, including conventional methods such as casting, forging, and machining. However, because of a need to produce more complex metal components, conventional techniques have proved to be inadequate for some applications, such as the manufacture of drill bits for subterranean drilling, and thus have actually limited the degree of complexity of such manufactured components.

One method that is not so limited in its ability to produce very complex components is layered-manufacturing as disclosed in U.S. Pat. No. 5,433,280, assigned to the assignee of the present invention and incorporated herein for all purposes by this reference. The '280 patent discloses a method of fabricating a drill bit body or bit component in a series of sequentially superimposed layers or slices. As disclosed, a drill bit is designed as a three-dimensional "solid" model using a computer-aided design (CAD) program, which allows the designer to size, configure and place all internal and external features of the bit, such as (by way of example) internal fluid passages and bit blank voids, and external cutter sizes, rakes and locations as well as the height, thickness, profile and orientation of lands and ridges on the bit face and the orientation, depth and profile of waterways on the bit face and junk slots on the bit gage. The CAD program then numerically "slices" the solid model into a large number of thin planar layers.

After the mathematical slicing or layering is performed by the CAD program, a horizontal platen is provided on which a granular or particulate material such as a tungsten carbide coated with a laser-reactive bonding agent such as a polymer, a resin, and/or a low melting point metal such as Wood's metal or a lead alloy, or tungsten carbide intermixed with such a laser-reactive bonding agent is deposited in a thin, uniform layer. A finely focused laser, a focused light source such as from an incandescent or discharge type of lamp, or other energy beams, programmed to follow the configuration of the lowermost or base section or layer of the bit body, is directed on the powder layer to melt the bonding agent and bond the metal particles together in the areas of the layer represented as solid portions of the bit in the model. Another layer of powder is then uniformly deposited over the first, now-bonded layer, after which the metal particles of the second layer are bonded to each other and simultaneously to the first layer by the laser. The process continues until all layers or slices of the bit, as represented by the solid numerical model, have been deposited and bonded, resulting in a mass of bonded-particulate material comprising a bit body which faithfully depicts the computer model in every dimensional respect. In areas of each layer which are not to form a part of the completed article, the laser does not traverse and bond the particles. Thus, a drill bit, or at least a bit body comprised of bonded-particulate material, may be fabricated directly from the CAD-generated solid model without the necessity of designing and fabricating molds and without the delicate, artistic hand labor currently required for bit details.

The bit body may then be placed in a furnace where it may be preheated to substantially remove the bonding agent. In such instances, certain metal powders may be at least preliminarily sintered or fused, such sintering to be enhanced or completed if necessary in a later furnacing operation.

If a powdered metal coated with a bonding agent or metal intermixed with a bonding agent is employed as the particulate material as mentioned above, the resulting bit body is a porous and permeable metal mass akin to a sponge or an open-cell foam which can be imbibed with suitable hardenable infiltrants, either metallic, non-metallic, or a combination thereof, to complete the bit body. If an infiltrant in liquid form at room temperature, such as certain polymers, is employed, the bit may be mass infiltrated via capillary, gravity, and/or pressurized flow at room temperature, while if an infiltrant that is solid at room temperature is employed, the bit would be mass infiltrated by capillary, gravity, and/or pressurized flow in a furnace, induction coil, or other heating methods known in the art of fabricating matrix-type drill bits from loose tungsten carbide powders contained in a mold.

U.S. Pat. No. 5,433,280 also discloses a tungsten carbide or other suitable powder or mix of powders (either metallic or non-metallic) having desired physical characteristics for a matrix substantially uniformly premixed with a powdered polymeric (or other nonmetallic) or metallic infiltrant powder, the premix deposited in layers and the infiltrant powder at least partially fused by a laser to bond the tungsten carbide particles into a matrix and define the bit body shape. After the layering and fusing process is completed, since the infiltrant is already in place, the bit body is heated in a furnace to effect complete in situ infiltration of the matrix. In another alternative to the foregoing procedure, layers of matrix powder alternating with layers of infiltrant powder are deposited. In either case, additional infiltrant may be added during infiltration to fill any infiltrant-deprived voids in the infiltrant-consolidated metal powder matrix. If an infiltrant-coated tungsten carbide or other suitable powder or mix of powders in a layered fashion is employed, a laser may be used to melt the infiltrant coating at least enough to cohere each layer, and the completed bit body placed in a furnace for an in situ infiltration of the bit body, with additional infiltrant being provided if necessary, as noted above.

While it is known in the art to infiltrate conventionally cast particulate metallic articles of manufacture, such as drill bits, with an infiltrant while still contained within their casting mold, layered-manufacturing does not require or generate a mold as a result of the manufacturing process.

While it is known that relatively small size and weight components may be infiltrated in a "free-standing" manner by placing the infiltrant around the component and heating until the infiltrant is imbibed or wicked into the component, the frictional properties of the layered component maintaining its configuration, such a "free-standing" approach has not proved to be practical for many larger, heavier and more complex layered-manufactured components, including drill bits and bit components such as blades. During high-temperature infiltration of such a massive layered-manufactured component, when the bonding agent effectively burns away, the mass of metallic particles is left with little or no cohesiveness and thus little or no internal structural strength for self-support. The component thus tends to collapse of its own weight during infiltration. Accordingly, it would be advantageous to provide either supplemental physical or other support for the three-dimensional component structure to ensure that the article of manufacture retains its layered-manufactured configuration during the infiltration process.

SUMMARY OF THE INVENTION

Accordingly, a method and apparatus for infiltrating preformed porous components that may have been fabricated from particulates using a layered-manufacturing technique, such as the method disclosed in U.S. Pat. No. 5,433,280, is provided. The invention may be said to be applicable to preforms of bonded particulates in general, regardless of the method of fabrication of the preform. The invention has specific applicability to drill bits and other drilling-related structures as well as other non-drilling-related articles of manufacture where structural support of the article during infiltration is of concern. More specifically, this method and apparatus is useful with larger, more massive, porous preformed components and/or components having cantilevered, thin or otherwise delicate portions that are not self-supporting and which may yield from their own weight during infiltration. The method and apparatus are also applicable to infiltration of assemblies of particulate-based components and assemblies including both particulate and non-particulate (solid) components. In several of the preferred embodiments, a mold or mold-like structure is provided that rigidly and/or pliably supports the layered-manufactured component, the rigidity of the mold being dependent upon the material used to form the mold or mold-like structure.

In a preferred embodiment, once a component or component assembly has been fabricated at least partially using a method of layered-manufacturing, a castable material, such as ceramic, plaster, graphite slurry or other similar materials known in the art able to withstand the high temperatures encountered during the infiltration process, is poured around the component to provide solid structural support upon solidification of the castable material. Similarly, the component or assembly may be dipped one or more times into a castable material, such as a ceramic, plaster, or graphite slurry to form a relatively rigid material around the component. In either case, it is preferable to pre-plug any orifices or openings leading to internal passageways in the component so that castable material that may otherwise be difficult to remove therefrom does not accumulate inside the component or assembly. Such plugs may be comprised of sand, graphite particles, clay or other suitable materials known in the art.

In another preferred embodiment, the layered component or assembly may be placed in a refractory vessel with granular material packed around it up to its uppermost surface. This granular material substantially completely surrounds all surfaces of the component and may be vibrated to more densely pack the granular material. Because the granular material maintains its granular form during infiltration and is non-wettable by the infiltrant, the granular material effectively forms a "pliable" mold. That is, the granular material continues to provide structural support for the component during infiltration as dimensions of the component change, such as by shrinkage that may occur as the bonding agent employed to preliminarily hold the metallic particles of the component together vaporizes. Preferably, the granular material does not sinter, tack, or otherwise strengthen during the infiltration process, and thus continues to support the component substantially throughout infiltration without substantial change in its supporting physical characteristics.

In yet another preferred embodiment, a granular material that sinters, chemically reacts, or otherwise strengthens during the infiltration process could provide a more rigid mold to support the component. Such a mold would be particularly beneficial for components that undergo little or no shrinkage.

In addition, it may be sufficient that a substantially rigid mold may be employed to provide support primarily during the first stages of infiltration, wherein the metallic particles of the layered component are imbibed with a sufficient amount of infiltrant and/or sufficiently sintered so that the component can structurally support itself.

Additionally, a mold material may be selected that conforms by shrinking and/or expanding along with any shrinkage and/or expansion of the component during the infiltration process to maintain a substantially rigid but conforming support structure. Such a mold would also help prevent infiltrant material from flowing out of the component and pooling in gaps that may otherwise form between the component and the interior surface of the mold if the dimensions of the mold remain constant relative to the varying dimensions of the component during infiltration.

In yet another preferred embodiment, a support structure according to the present invention may have equal utility for a component comprised of metallic particles intermixed with particles of an infiltrant material. With such a component, it may not be necessary to leave at least one surface exposed for additional infiltrant to be imbibed into the component. Such a component, however, may require structural support similar to other components herein described.

Preferably, all of the materials used to form the support structure and/or fill any internal cavities in the component are formed from materials that are non-wettable by the infiltrant. That is, these materials do not absorb or otherwise chemically or mechanically bond to or react with the infiltrant utilized for infiltration. Rather, these materials form a barrier, because of their non-wettable quality, around the component such that the infiltrant stays contained within the component and does not bind the support structure to the component. In addition, the molds or support structures herein described are preferably formed from materials that are substantially permeable to gases and vapors generated during the infiltration process, so as to preclude the formation or retention of gas or vapor voids in the component being infiltrated.

In yet another preferred embodiment, if a wettable material is used to form the support structure, the component may be coated with an infiltrant-resistive material, such as boron nitride or other suitable materials known in the art, prior to being placed within, or surrounded by, the support material. The boron nitride may be simply sprayed or painted onto various surfaces of the component, or the component may be dipped into a container of a boron nitride suspension to form a barrier through which the infiltrant cannot flow out of the component and imbibe the wettable support structure. Thus, the non-wettable (by the infiltrant) resistive coating keeps the molten infiltrant contained within the layered component. In addition, such a coating may aid in forming a better surface finish for the component as it creates an intermediate shell to which the layered part and the infiltrant can conform during infiltration. Moreover, due to its liquid consistency, the coating fills small voids, vugs or intricately configured areas that may not be completely, intimately contacted by the surrounding support material. During the coating process, it is generally desirable to leave at least one surface uncoated so that the component has at least one non-resistive or wettable surface through which to imbibe additional infiltrant, even if infiltrant is already present in the preformed component. It is contemplated that such a resistive coating may be used in conjunction with other preferred embodiments of the present invention, whether the support material is wettable or non-wettable, to help form a better surface finish and help ensure that the infiltrant does not flow out of the component and into the support structure, pool in any voids, gaps or vugs present between the component and the support structure, or form an unwanted skin of infiltrant on the outer surface of the component.

After the layered-manufactured component has been properly supported according to the present invention, the article of manufacture and any supporting materials and/or structures can be placed within a traditional furnace, an induction coil furnace, or other heating apparatus known in the art along with an infiltrant and heated until the infiltrant melts and substantially fully permeates the article of manufacture through the free surface exposed to the infiltrant. The materials used to infiltrate the component are typically copper-based alloys containing other elements such as nickel, as known in the art of fabrication of matrix-type drill bits. However, it is contemplated that any suitable infiltrant compatible with the particulates of the component preform may be used in conjunction with the present invention.

DETAILED DESCRIPTION OF THE PREFERRED EMBODIMENTS

Figure 1:
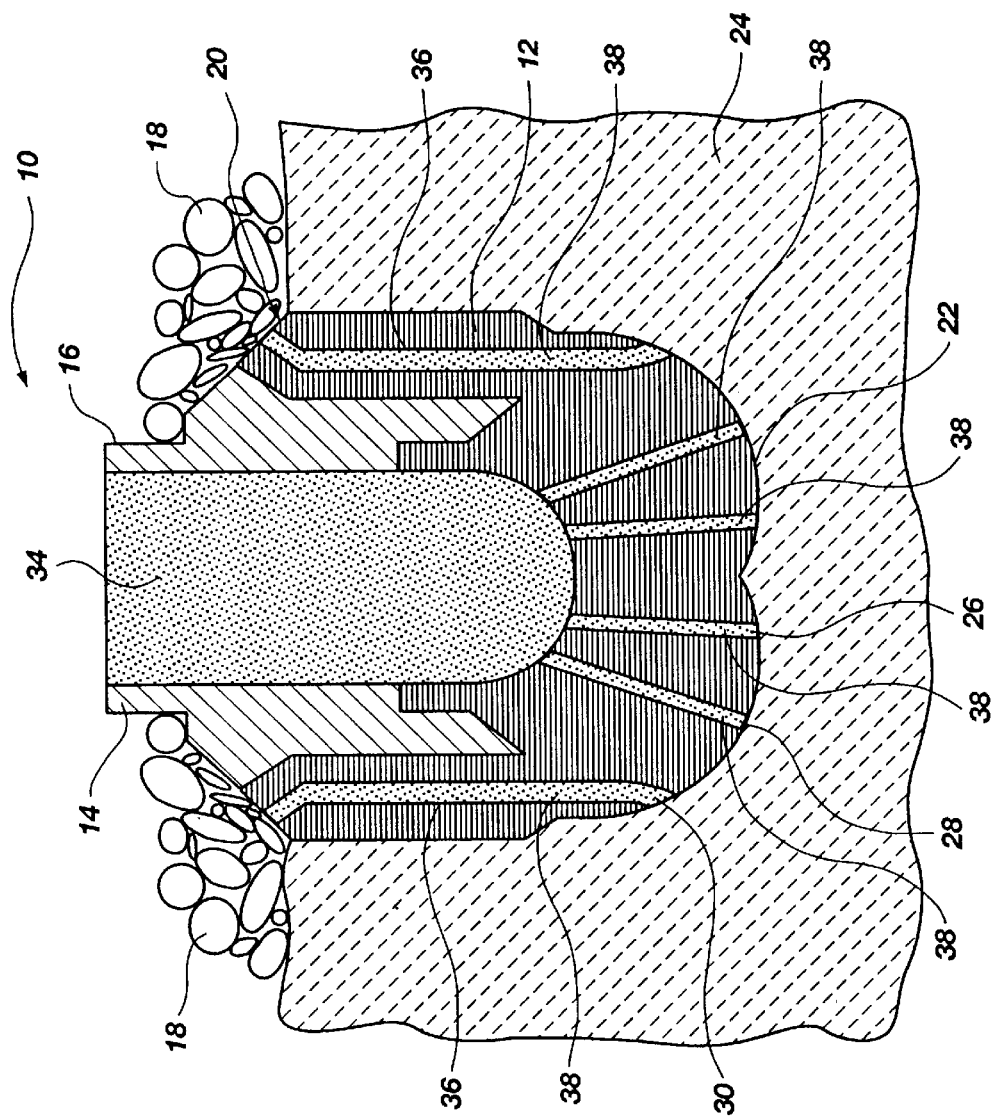
FIG. 1 is a cross-sectional view of a first embodiment of a support structure according to the present invention supporting a layered-manufactured drill bit therein.

FIG. 1 depicts a drill bit 10 that includes a layered-manufactured bit crown 12 and a blank 14 positioned within the crown 12, the blank 14 having a machinable portion 16 for threading and attaching a bit shank thereto as known in the art. The crown 12 may be a two-part matrix comprised of metal particulates bonded together with a laser-reactive bonding agent, such as a polymer, resin, Wood's metal, lead alloy and/or other suitable material known in the art. While the particles of metal forming the crown 12 may be partially sintered together, depending on the energy level of the laser of the layered-manufacturing apparatus, typically it is the polymer that holds the structure of the crown 12 together prior to infiltration. Thus, the layered-manufactured crown 12 is relatively fragile compared to the structural strength it must have once incorporated into a finished drill bit.

In order to physically attach the crown 12 to the blank 14 and to strengthen the bit 10 as a whole, the bit 10 is imbibed with a hardenable infiltrant 18. The infiltrant 18 is typically copper or copper-based with tin and/or nickel, such as those infiltrants commercially available from Belmont Metals, Inc. of Brooklyn, N.Y., or may comprise other metallic or non-metallic materials known in the art including silver, nickel, tin, zinc, iron, cobalt, lead, Wood's metal, solders and alloys thereof. As shown in FIG. 1, for steel and tungsten carbide components, a metallic infiltrant 18 in pellet form is typically placed adjacent an exposed portion 20 of the crown 12.

For infiltration to occur, the bit 10 is loaded into a furnace or other heating device, such as an induction coil as known in the art, and heated to about 950° to 1200° C., at which temperature the infiltrant 18 has liquified and will imbibe into the various parts of the drill bit 10. During infiltration, the infiltrant 18 melts and is capillary fed past the blank 14 and through the crown 12. The infiltrant 18 effectively binds the particles comprising the crown 12 together, as well as the crown 12 to the blank 14, resulting in a single structure. In addition, the infiltrant 18 fills voids or vugs present between the particles of the crown 12.

Because of the substantial mass, and thus the weight of the crown 12 and the blank 14, it may be necessary to provide support for the layered-manufactured crown 12 of the drill bit 10. In particular, because the particles forming the crown 12 may be held together by a polymer or epoxy resin, the structural integrity that such a component may have at room temperature may not be maintained during the infiltration process. Specifically, structural collapse may occur in more massive components, where cantilevered, thinned or poorly supported portions, exist such as in the distal end 22 of the crown 12, that would otherwise be employed to help support the weight of the bit 10. Also, as previously noted, assemblies of components, such as shown in FIG. 1, or assemblies of particulate-based preforms, such as bit bodies and bit blades, may require support. Accordingly, in a preferred embodiment, a hardenable liquid and/or castable material 24, such as Cotronics 770 ceramic, plaster, or other materials known in the art that can withstand the high temperatures encountered during the infiltration process, is poured around the bit 10 to provide solid structural support or mold upon solidification of the castable material 24. Similarly, the bit 10 may be dipped one or more times into a castable material, such as a ceramic or plaster slurry to form a relatively rigid material around the bit 10.

In any case, it may be preferable to plug or substantially fill any orifices or openings, such as orifices 26, 28, and 30, leading to internal chamber or plenum 34 or passageways 36 in the component so that castable material 24 that may otherwise be difficult to remove therefrom does not accumulate inside the bit 10. Such plugs or filler material 38 may be comprised of various non-wettable materials such as sand, graphite particles, or other suitable materials known in the art. It should be noted, that for castable materials that can be easily removed from plenum 34 or passageways 36, it may not be necessary to provide plug or filler material 38, allowing the castable material 24 to pre-fill the plenum 34 and passageways 36 of the bit 10.

It is also contemplated that filler material 38 that can be relatively easily removed from orifices 26–30, plenum 34 and passageways 36 of the drill bit 10 may provide sufficient internal support for the drill bit 10 during infiltration such that external support provided by the castable material 24 may not be required. For example, the plenum 34 and passageways 36 could be filled with a hardenable material such as a graphite slurry that can later be dissolved, destroyed or otherwise removed after or while infiltration occurs. Such a configuration would allow infiltrant 18 to be placed adjacent the crown 12 and subsequently "wicked" into the bit 10 as the infiltrant 18 melts, and would not necessitate the use of external support of the bit 10 during infiltration. It is appreciated, however, that both internal and external support could be combined to structurally support the bit 10 during infiltration.

Figure 2:
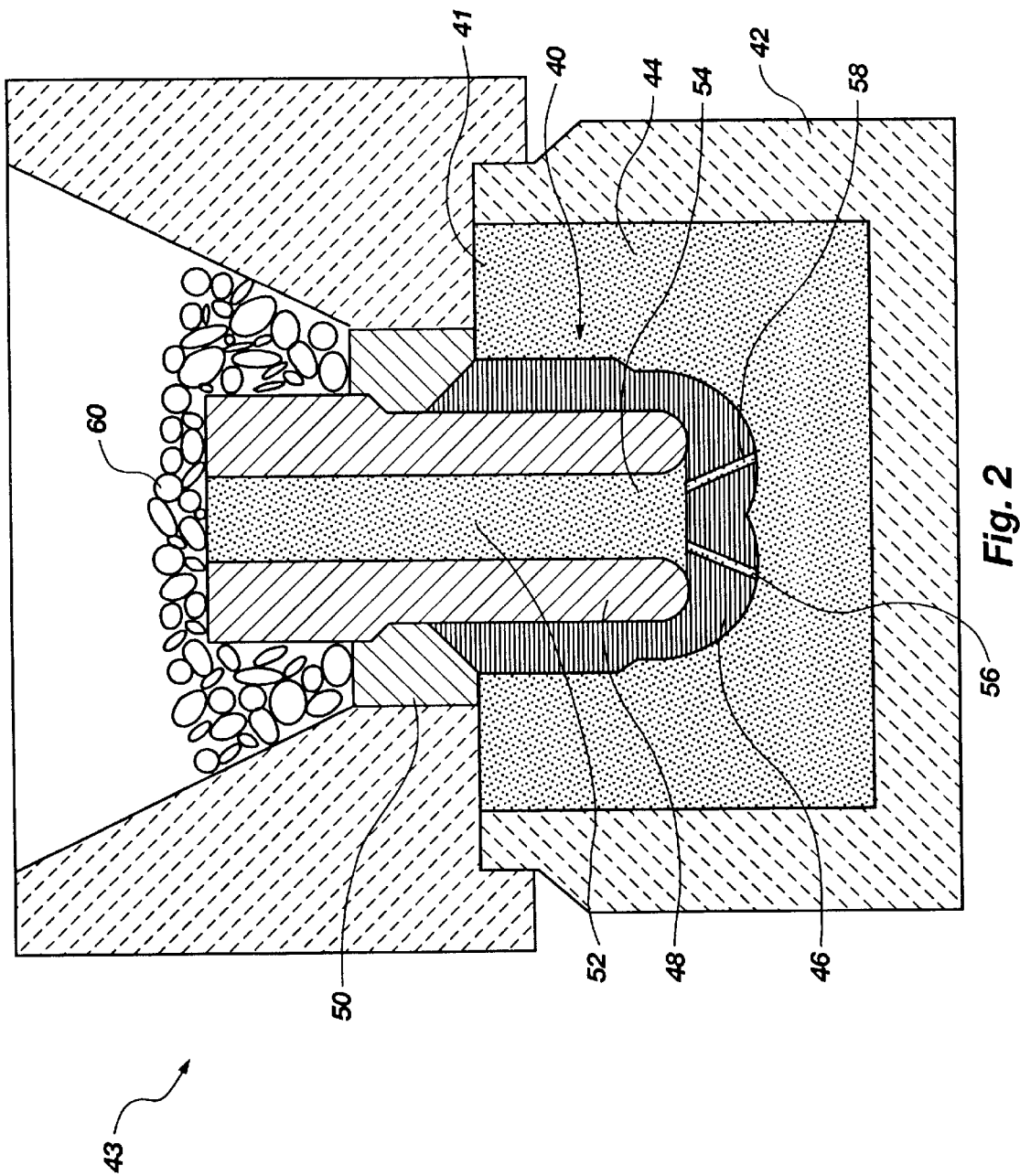
FIG. 2 is a cross-sectional view of a second embodiment of a support structure according to the present invention supporting a layered-manufactured drill bit therein.

FIG. 2 illustrates another preferred embodiment of the present invention showing a drill bit 40 positioned within a refractory vessel 42 and surrounded by granular, non-wettable particulate matter 44. The bit 40 is comprised of a layered-manufactured crown 46 of particulate material, a pre-machined steel blank 48 positioned within the crown 46, and machinable powder 50 such as tungsten in a ring-like shape surrounding a portion of the blank 48 and that can be later machined to provide an interface between the crown 46 and the blank 48. The crown 46 may be layered-manufactured from a laser-reactive, bonding agent coated, metallic powder or metallic powder, such as steel, tungsten carbide or a combination thereof, intermixed with a laser-reactive bonding agent such as a polymer, the polymer being heated with laser energy to bond the particles of metallic powder together. Once formed, the crown 46 is heated for infiltration during which time the crown 46 may shrink in size as the polymer dissipates or vaporizes or as the particles of metal powder sinter together. Dissipation and/or vaporization may be assisted by flowing a scavenging, reducing, or oxidizing gas, such as oxygen, hydrogen, or mixtures of oxygen and hydrogen with other gases, or by flowing a solvent such as certain alcohols, esters, hydrocarbons, petroleum, chlorinated solvents, ketones, and other organic or inorganic materials through the preformed crown 46 to dissolve and substantially remove the polymer from the crown 46. Accordingly, a "soft" or unconsolidated mold 41 formed from a granular, non-wettable, particulate matter 44, which may be comprised of casting sand, graphite, ceramic powder, silica, alumina, silicon carbide and/or combinations thereof, or other suitable materials known in the art that will not harden or otherwise become rigid during the infiltration process, may be able to maintain conformance to the shrinking crown 46 and thus maintain structural support of the crown 46 during infiltration. More specifically, as the polymer used to hold the particles of the layered-manufactured bit crown 46 together vaporizes, the particulate matter 44 may retain its unconsolidated quality to conform to any initial changes in size of the crown 46 and thus continue to provide support for the crown 46. In addition, the ability of the particulate matter 44 to be relatively compliant relative to the crown 46 may keep the infiltrant material 60 from pooling or accumulating in gaps that may otherwise form between a substantially rigid, dimensionally stable mold and a shrinking bit crown.

It is also contemplated that a relatively loose material that solidifies or otherwise strengthens during the infiltration process by sintering, tacking, and/or chemically bonding may provide sufficient support for the bit 40. That is, a particulate matter 44 could be selected that would retain its unconsolidated nature as the polymer, or other material initially binding the crown 46 together, is being removed and as the part is changing shape. At higher temperatures, however, after the polymer has been removed and the part is relatively dimensionally stable, the particulate matter 44 could solidify or otherwise strengthen to provide a more rigid support. Thus, in effect, the mold 41 conforms to the bit 40 during the beginning stages of furnacing and then becomes more firm during infiltration.

In addition, other alternatives include a mold 41 that is initially substantially rigid, that weakens over time at the infiltration temperature, and is subsequently easily removed from the infiltrated component or assembly. For example, sand bonded together with a polymer may provide rigid support until the polymer reaches a temperature near the infiltration temperature at which it melts, vaporizes and/or otherwise dissipates, leaving the sand in a relatively loose form.

Preferably, the particulate matter 44 is vibrated prior to infiltration to substantially pack the particulate matter 44 around the bit 40. In addition, the same or other non-wettable, particulate matter 52 can be provided in internal chambers or passageways 54, 56, and 58 of the bit 40. To help promote complete infiltration and fewer pores within the bit material, a vacuum may be applied to the mold assembly 43 to eliminate gas or vapor pockets and draw the infiltrant 60 past the blank 48 and through machinable powder 50 and crown 46. Conversely, the mold assembly 43 may be pressurized to help force the infiltrant 60 through the bit 40.

Figure 3A:
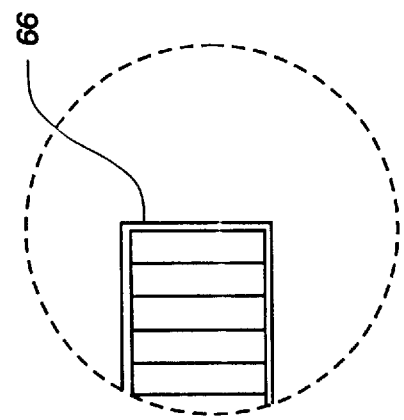
FIGS. 3 and 3A are cross-sectional views of a third embodiment of a support structure according to the present invention supporting a layered-manufactured impeller for a centrifugal pump therein.
Figure 3:
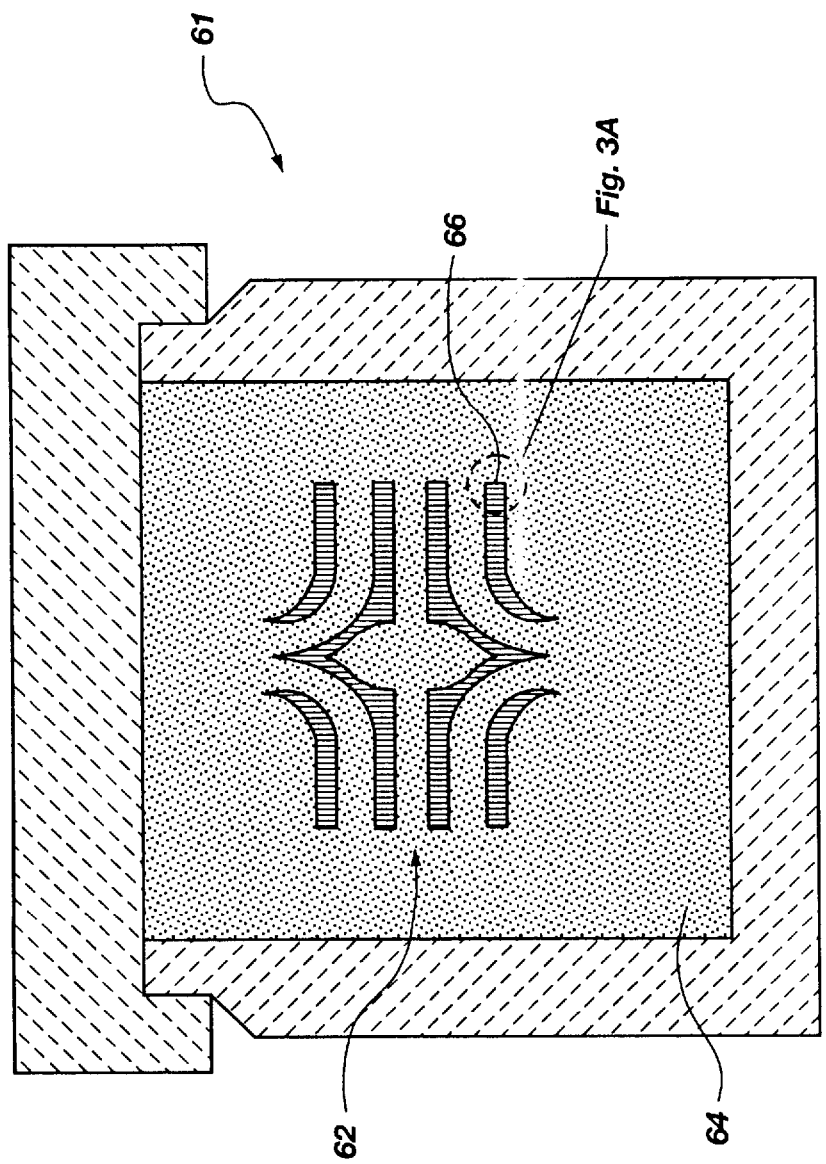

FIGS. 3 and 3A depict yet another preferred embodiment of the present invention illustrating another configuration for a mold 61 wherein an infiltrant has been incorporated into the layered-manufactured component 62. FIGS. 3 and 3A also illustrate the applicability of the present invention to non-drilling-related structures, such as an impeller 62 for use in a centrifugal pump. During the layered-manufacturing process, it may be possible to layer both the metallic particles and the infiltrant material substantially simultaneously or layer-by-layer to form the impeller 62. Accordingly, it may not be necessary to provide an exposed surface through which additional infiltrant may be imbibed as illustrated in other preferred embodiments herein described. If, however, additional infiltrant is desired, a mold configuration similar to that illustrated in FIG. 2 may be utilized to expose a surface of the impeller 62 and allow the additional infiltrant to be placed adjacent the surface and imbibed therethrough.

The particulate matter 64 of the mold 60, while preferably non-wettable, may be a wettable substance, such as steel and/or stainless steel to improve the thermoconductivity of the mold 60. Accordingly, it may be desirable to coat various surfaces of the component being infiltrated by spraying, painting, dipping or otherwise coating with a sealer or other non-wettable substance, such as boron nitride, aluminum nitride, Nicrobraze Green Stop-off manufactured by Wall Colmonoy, Inc. of Madison Heights, Mich., and other materials such as Zircwash manufactured by Zyp Coatings, Inc. of Oak Ridge, Tenn., so that the particulate matter 64 will not bond the particulate comprising the impeller 62 to the surrounding particulate matter 64. A resistive coating 66 (as better shown in FIG. 3A) may serve to keep the infiltrant within the confines of the impeller 62 so that the particulate matter 64 is not bonded to the impeller 62. Moreover, it is contemplated that such a resistive coating 66 may serve to improve the surface finish of the finished component whether it be a drill bit, such as bit 10, or some other component, such as impeller 62, by filling exterior and/or interior pores of the layered component and providing a more consistent surface to which the infiltrant can solidify. Thus, the resistive coating 66 may be incorporated into other embodiments herein described regardless of the material comprising the mold and/or support structure.

For more rigid molds and/or support structures in accordance with the present invention, after infiltration, the mold form may be broken off of the component and the material filling internal passages and other voids removed. For unconsolidated support structures, the infiltrated component may simply be dumped out of the refractory vessel along with any particulate material contained therein.

Figure 4A:
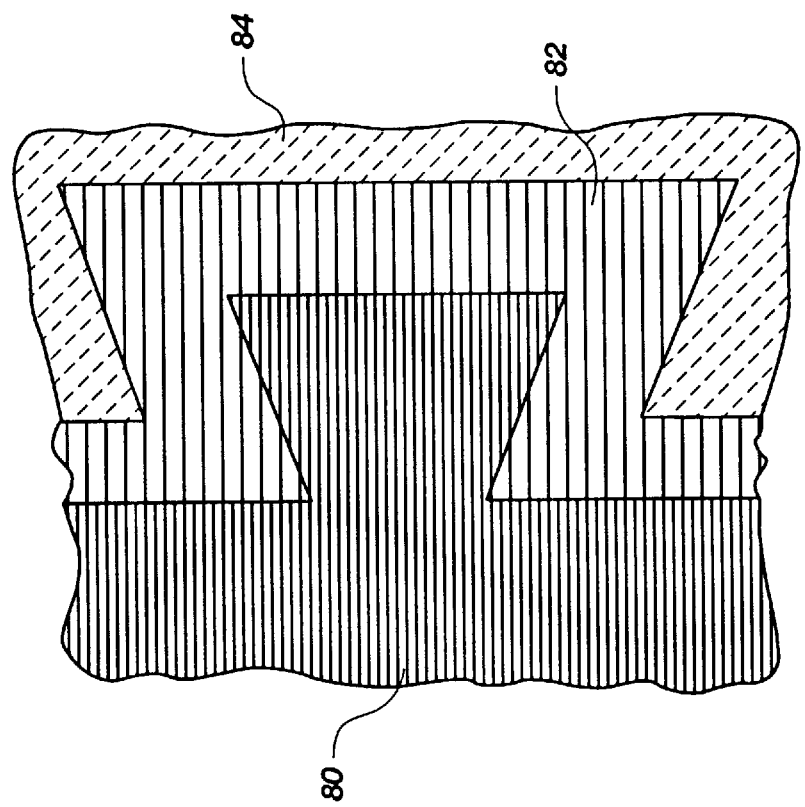
FIG. 4A is a partial-sectional view of interlocking components within a support structure according to the present invention.
Figure 4:
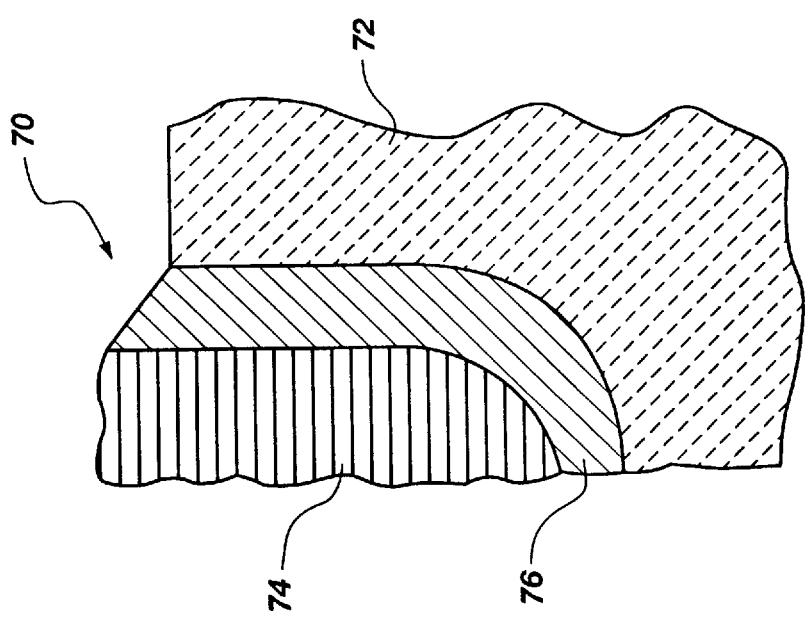
FIG. 4 is a partial-sectional view of a drill bit including a blade within a support structure according to the present invention.

It will be recognized by those skilled in the art that the method and apparatus according to the present invention has utility for many components other than those specifically illustrated herein. For example, FIG. 4 illustrates a partial view of a drill bit 70 positioned within a mold 72, the drill bit comprising a layered-manufactured body 74 and a preformed blade 76 adjacent the body 74. Such a blade 76 could provide external support for the body 74, with the mold 72 supporting the entire assembly. In addition, the method of infiltrating components and assemblies according to the present invention allows various components, such as interlocking, pre-infiltrated components 80 and 82 illustrated in partial view in FIG. 4A, to be pre-assembled and then infiltrated with mold 84 providing structural support. Moreover, those skilled in the art will appreciate that whether a metal such as steel is employed to form the layered-manufactured component or the layered-manufactured component is comprised of powdered tungsten carbide or other metallic and/or non-metallic materials, the invention has equal utility to any material where heat is utilized to transform a relatively weakly bonded component to a structurally stronger, self-supporting body.

In addition to the preferred embodiments specifically illustrated herein, it is contemplated that other external or internal constraints may equally be employed to support the layered-manufactured component during infiltration or other manufacturing processes. Finally, those skilled in the art will appreciate that one or more features of the illustrated embodiments may be combined with one or more features from another to form yet another combination within the scope of the invention as described and claimed herein. Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of infiltrating a preformed, three-dimensional component structure, comprising:
    substantially conformably supporting at least one surface of at least one three-dimensional, preformed component comprised of bonded particulates including providing a barrier of material substantially non-wettable to a selected hardenable liquid infiltrant proximate said at least one surface; and
    infiltrating said at least one preformed component with said selected hardenable liquid infiltrant.

2. The method of claim 1, further comprising layered-manufacturing said at least one preformed component.

3. The method of claim 2, wherein said supporting includes filling at least a portion of said at least one preformed component with said substantially non-wettable material.

4. The method of claim 1, wherein said supporting includes providing a mold of said substantially non-wettable material about said at least one preformed component.

5. The method of claim 4, wherein said providing a mold includes casting said substantially non-wettable material around said at least one preformed component and permitting said castable material to at least partially set prior to said infiltration of said at least one preformed component.

6. The method of claim 1, further including substantially plugging at least one cavity in said at least one preformed component with a material substantially non-wettable by said selected hardenable liquid infiltrant.

7. The method of claim 6, wherein said non-wettable plugging material is selected from the group comprising sand, graphite, silica, alumina, and silicon carbide.

8. The method of claim 1, wherein said supporting comprises dipping said at least one preformed component in a castable, substantially non-wettable material and permitting said castable, substantially non-wettable material to at least partially set prior to said infiltration of said at least one preformed component.

9. The method of claim 4, wherein said providing a mold further comprises providing a vessel, positioning said at least one preformed component within the vessel, and at least partially filling the vessel about said at least one preformed component with granular material.

10. The method of claim 9, further including packing the granular material by vibrating the vessel prior to said infiltration of said at least one preformed component.

11. The method of claim 9, wherein the granular material is non-wettable by said selected hardenable liquid infiltrant.

12. The method of claim 9, wherein the granular material is wettable by said selected hardenable liquid infiltrant, and said method further comprises coating an exterior surface of said at least one preformed component with a material substantially non-wettable by said selected hardenable liquid infiltrant prior to said at least partially filling the vessel.

13. The method of claim 1, wherein said supporting includes coating at least a portion of said at least one preformed component with a coating substantially non-wettable by said selected hardenable liquid infiltrant prior to said infiltration of said at least one preformed component.

14. The method of claim 1, wherein the selected hardenable liquid infiltrant is selected from the group comprising copper, silver, nickel, tin, zinc, iron, cobalt, lead, Wood's metal, solder and alloys thereof.

15. The method of claim 1, wherein the selected hardenable infiltrant is selected from the group of non-metallic infiltrants comprising polymers and resins.

16. The method of claim 11, wherein said non-wettable granular material is selected from the group comprising sand, graphite, silica, alumina, and silicon carbide.

17. The method of claim 12, wherein the substantially non-wettable coating material is selected from the group comprising boron nitride, aluminum nitride, Nicrobraze Green Stop-off, and Zircwash.

18. The method of claim 1, further comprising fabricating said at least one preformed component by bonding said particulates together.

19. The method of claim 19, wherein said bonding comprises bonding by melting a polymer.

20. The method of claim 19, wherein said bonding comprises sintering.

21. The method of claim 1, further including removing a material constituent from said at least one preformed component.

22. The method of claim 22, wherein said removing a material constituent is at least partially effected by flowing a fluid through said at least one preformed component.

23. The method of claim 23, wherein said fluid is selected from the group comprising a scavenger gas, a reducing gas, an oxidizing gas and a solvent.

24. The method of claim 22, wherein said removing a material constituent is effected prior to said infiltration of said at least one preformed component.

25. The method of claim 1, further comprising assembling at least two preformed bonded-particulate components prior to said infiltration thereof.

26. The method of claim 1, further comprising assembling said at least one preformed bonded-particulate components with at least one substantially solid three-dimensional component prior to said infiltration.

27. The method of claim 1, further comprising interlocking said at least one preformed bonded-particulate component with another three-dimensional component prior to said infiltration.

28. The method of claim 1, further comprising supporting said at least one preformed component with a non-wettable material which is substantially fluid permeable.

29. The method of claim 1, wherein said supporting is provided by a support internal to said at least one preformed component.

30. The method of claim 8, wherein said castable material is selected from the group comprising ceramic, graphite and plaster.

31. The method of claim 9, further comprising consolidating said granular material into a substantially rigid support.

32. The method of claim 9, further comprising maintaining said granulated material in a state to provide a substantially compliant support during said infiltration of said at least one preformed component.

33. The method of claim 9, further comprising strengthening support provided by said granulated material to said at least one preformed component during said infiltration thereof.

34. The method of claim 15, wherein said supporting includes coating at least a portion of said at least one preformed component with a coating substantially non-wettable by said selected hardenable liquid infiltrant prior to said infiltration of said at least one preformed component.

35. The method of claim 35, wherein the substantially non-wettable coating is selected from the group comprising boron nitride, aluminum nitride, Nicrobraze Green Stop-off, and Zircwash.

36. The method of claim 1, further comprising incorporating said selected hardenable liquid infiltrant into said at least one preformed component prior to said supporting.

37. The method of claim 37, wherein said selected hardenable liquid infiltrant is incorporated into said at least one preformed component in solid form.

38. The method of claim 1, further including introducing said selected hardenable liquid infiltrant through an exterior surface of said at least one preformed component for said infiltration thereof.

39. The method of claim 39, further comprising preplacing a quantity of said selected hardenable liquid infiltrant within said at least one preformed component.

40. The method of claim 40, wherein said preplaced quantity of selected hardenable liquid infiltrant is preplaced in solid form.

* * * * *

UNITED STATES PATENT AND TRADEMARK OFFICE
CERTIFICATE OF CORRECTION

PATENT NO. : 5,839,329
DATED : November 24, 1998
INVENTOR(S) : Smith, et. al.

It is certified that error appears in the above-identified patent and that said Letters Patent is hereby corrected as shown below:

|  | Column 1 | line 21 | after "particulates" delete --and--. |
|---|---|---|---|
|  | Column 8 | line 52 | change "mold 60" to --mold 61--. |
|  | Column 8 | line 55 | change "mold 60" to --mold 61--. |
| Claim 19 | Column 10 | line 64 | change "19" to --18--. |
| Claim 20 | Column 10 | line 66 | change "19" to --18--. |
| Claim 22 | Column 11 | line 4 | change "22" to --21--. |
| Claim 23 | Column 11 | line 7 | change "23" to --22--. |
| Claim 24 | Column 11 | line 10 | change "22" to --21--. |
| Claim 26 | Column 11 | line 17 | change "components" to --component--. |
| Claim 35 | Column 12 | line 14 | change "35" to --34--. |
| Claim 37 | Column 12 | line 21 | change "37" to --36--. |
| Claim 39 | Column 12 | line 28 | change "39" to --38--. |
| Claim 40 | Column 12 | line 31 | change "40" to --39--. |

Signed and Sealed this

Second Day of May, 2000

Attest:

Q. TODD DICKINSON

Attesting Officer

Director of Patents and Trademarks